Dec. 9, 1947. H. J. GOODYER 2,432,308
CONDUIT HAVING ANNULAR RIBS, A SUMP, AND SEDIMENT DIRECTING MEANS
Filed Dec. 29, 1943
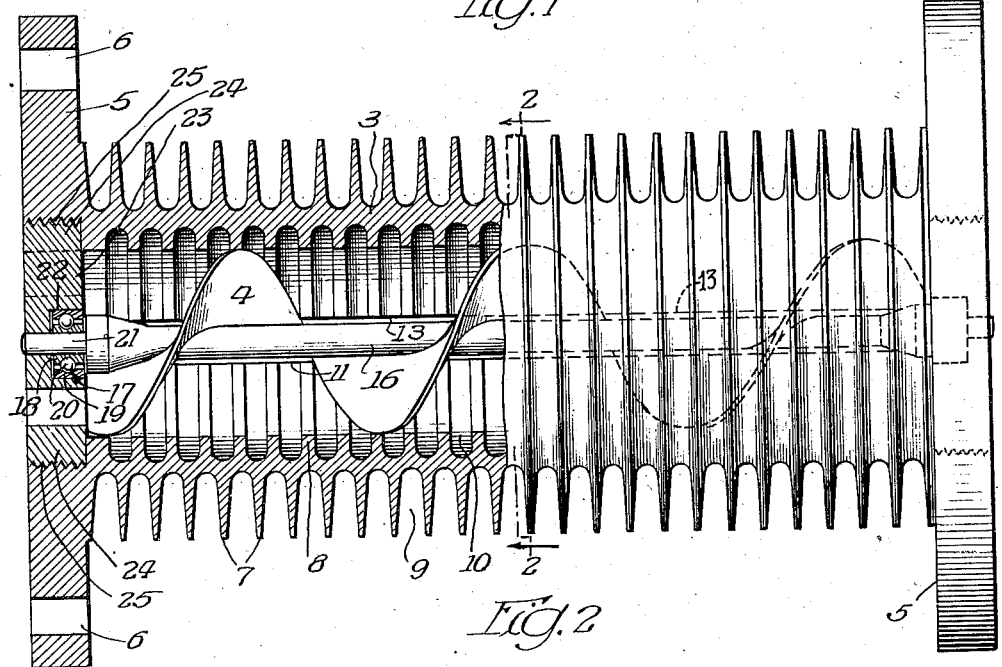
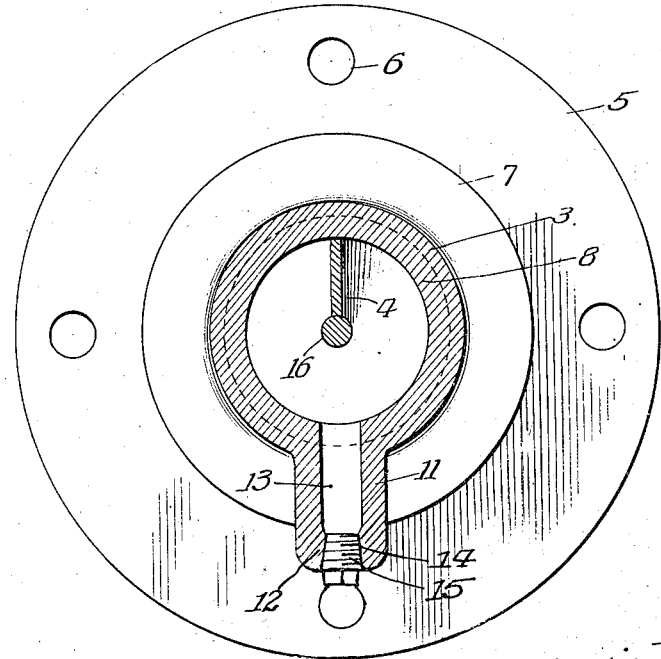
Inventor
Harold J. Goodyer
By Thed. Gerlath, Atty Patented Dec. 9, 1947

2,432,308

UNITED STATES PATENT OFFICE 2,432,308

CONDUIT HAVING ANNULAR RIBS, A SUMP, AND SEDIMENT DIRECTING MEANS

Harold J. Goodyer, Chicago, Ill.

Application December 29, 1943, Serial No. 516,013

10 Claims. (Cl. 210—57)

1

The present invention relates generally to conduits. More particularly the invention relates to that type of conduit which is adapted to be interposed in, and to form a part of, a pipe system for fluid under pressure.

One object of the invention is to provide a conduit of this type which is so designed and constructed that it may be used as a medium for transferring heat from, or to, the fluid under pressure flowing therethrough or as an instrumentality for separating foreign substances or particles from the fluid or as a combined heat exchanger and separator.

Another object of the invention is to provide a conduit of the last mentioned character which comprises a tubular open ended casing having a longitudinally extending series of spaced apart external annular ribs and a longitudinally extending series of spaced apart internal annular ribs, and also comprises a helical baffle which extends longitudinally through the casing and serves to cause the fluid passing through the casing to flow or impinge against the internal ribs.

A further object of the invention is to provide a conduit of the type and character last mentioned in which the helical baffle in the casing is supported so that it is rotatable about its axis.

A still further object of the invention is to provide a conduit of the type under consideration which is characterized by high efficiency and also simplicity of design or construction.

Other objects of the invention and the various advantages and characteristics of the present conduit will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a plan view of a conduit embodying the invention, certain parts being broken away and other parts being shown in section for illustrative purposes; and Figure 2 is a transverse section taken on the line 2—2 of Figure 1.

The conduit which is shown in the drawing constitutes the preferred form or embodiment of the invention. It is designed to be interposed in, and to form a part of, a pipe system (not shown) for fluid under pressure and functions as a heat exchanger or an instrumentality for

2 separating foreign substances or particles from the fluid under pressure flowing therethrough or as a combined heat exchanger and separator. As its main or principal parts the conduit comprises a tubular casing 3 and a helical baffle 4.

The casing 3 is preferably in the form of a one-piece casting of aluminum, brass or any other material having high heat conductivity. It is adapted to extend horizontally and embodies at its ends integral out-turned annular flanges 5 whereby it may be connected to adjoining flange equipped pipe sections of the system in which the conduit is employed. The flanges 5 are provided with holes 6 for accommodating bolts or other attaching instrumentalities. In addition to the flanges 5 the casing 3 embodies a longitudinally extending series of external annular ribs 7 and a longitudinally extending series of internal annular ribs 8. The external ribs 7 are formed integrally with the casing and are spaced equidistantly apart. They are the same in diameter and define ring-shaped pockets 9 between them. The internal ribs 8 are formed integrally with the casing as shown in Figure 1. They are spaced equidistantly apart and are disposed midway between the external ribs 7. The spaces between the internal ribs 8 constitute ring-shaped pockets 10. As shown in the drawing the internal ribs 8 are of less thickness than radial width and are so spaced apart that the ring shaped pockets 10 that are between them are of greater depth than thickness. By having the internal ribs of less thickness than radial width and having the ring shaped pockets 10 of greater depth than thickness the conduit, especially when it is used for separating foreign substances or particles from fluid under pressure, possesses extremely high efficiency. The bottom portion of the casing 3 is provided with a pair of longitudinally extending depending laterally spaced walls 11 and a crosswall 12 between the lower margins of the walls 11 and these walls define a longitudinal sump 13 which communicates with the lower portions of all the ring-shaped pockets 10 and extends from one flange 5 to the other as shown in Figure 1. When the conduit is used as an instrumentality for separating foreign substances or particles from the fluid under pressure passing through the casing 3 the foreign substances or particles which collect in the pockets 10 gravitate into the sump 13 and are there collected. A vertically extending discharge opening 14 is formed in the crosswall 12 and this is normally closed by a screw plug 15. When it is desired to remove the collected substances or particles in the sump the screw plug 15 is removed so as to uncover the discharge opening 14.

The helical baffle 4 is disposed in, and extends longitudinally of, the casing 3 of the conduit. It extends around, and is secured to, a horizontal shaft 16 and is of slightly less diameter than the internal diameter of the internal annular ribs 8. When the conduit is in use the fluid under pressure passing or flowing through the tubular casing 3 engages the baffle 4 and hence is caused to travel in a spiral or helical course through the casing and to come into intimate contact with the internal ribs 8. The ends of the shaft 16 are supported by way of a pair of ball bearings 17 in order that the helical baffle is free to rotate about its axis. When the conduit is in use the fluid under pressure passing through the casing impinges against the baffle as heretofore pointed out, and causes the baffle to rotate. As the result of rotation of the baffle the fluid is flung outwards against the internal ribs 8 and the various substances or foreign particles which accumulate on the baffle are caused to be flung outwards by centrifugal force so that they lodge in the ring-shaped pockets 10 and then gravitate into the sump 13. The ball bearings 17 consist of inner races 18, outer races 19 and balls 20 between the inner and outer races. The inner races extend around, and are shrunk onto, reduced extensions 21 at the ends of the baffle carrying shaft 16. The outer races 19 of the ball bearings 17 fit within cylindrical recesses 22 in the hubs of a pair of spiders 23 at the ends of the conduit casing 3. The spiders are provided with rims 24 and these fit within the inner peripheries of the out-turned annular flanges 5 and are removably secured thereto by way of screw thread connections 25.

When the conduit is connected in place in a pipe system having fluid under pressure flowing through it the fluid when passing or travelling through the tubular casing 3 of the conduit encounters the helical baffle 4 and, as previously pointed out, causes the baffle to rotate as the result of frictional engagement therewith. Because of the action of the baffle the fluid travels spirally or helically through the casing and is hence brought into contact with the annular internal ribs 8. Such ribs, together with the external ribs 7, serve to transfer heat from, or to, the fluid, depending upon whether the substance surrounding the conduit casing or the fluid is of higher temperature. Should the fluid under pressure passing through the casing have foreign substances or particles suspended therein such substances or particles are caused to lodge in the ring-shaped pockets 10 and then gravitate into the sump 13 from whence they may be discharged by removal of the screw plug 15.

The herein described conduit possesses high efficiency and is characterized by simplicity of design or construction. In addition it has many capabilities of use, for example, the conduit may be used in the high pressure pipe line between the compressor and condenser of a mechanical refrigerating system. When used in this particular capacity the conduit serves not only as a medium for dissipating heat from the compressed refrigerant flowing through the casing, but also as an instrumentality for ridding the refrigerant of oil and any other foreign substances therein.

The invention is not to be understood as restricted to the details set forth since these may be modified within the scope of the appended claims without departing from the spirit and scope of the invention.

Having thus described the invention, what I claim as new and desire to secure by Letters Patent is:

1. An elongated conduit adapted to have fluid type material pass normally only longitudinally through it and comprising a substantially imperforate tubular casing having a longitudinal series of equidistantly spaced transversely extending independent truly annular single thickness internal ribs of less thickness than the radial width and so spaced apart that they form between them ring shaped pockets of greater depth than thickness, and a helical baffle mounted centrally in, and extending longitudinally of, the casing and serving to cause the material passing through the casing to flow against the ribs.

2. An elongated conduit adapted during use to have fluid under pressure flow only longitudinally therethrough and comprising an imperforate tubular casing having a longitudinal series of equidistantly spaced transversely extending independent truly annular single thickness internal ribs of the same internal diameter, of less thickness than radial width, and so spaced apart that they form between them ring shaped pockets of greater depth than thickness, stationary spiders mounted fixedly in the ends of the casing and provided with centrally disposed hubs with bearings therein, a shaft extending longitudinally and centrally through the casing and having the ends thereof journalled in said bearings in the hubs of the spiders, and a helical baffle extending around, and fixedly secured to, the shaft and having the diameter thereof substantially the same as the internal diameter of the ribs.

3. A conduit adapted to have fluid under pressure flow therethrough and comprising a tubular horizontally disposed casing having a longitudinal series of spaced apart transversely extending annular internal ribs and embodying at the bottom portion thereof a longitudinal depending sump in communication with the lower portions of the spaces between the ribs, and baffle means in the casing for causing the fluid passing through said casing to flow against the ribs.

4. A conduit adapted to have fluid under pressure flow therethrough and comprising a tubular horizontally disposed casing having a longitudinal series of spaced apart transversely extending annular internal ribs and embodying at the bottom portion thereof a longitudinal depending sump in communication with the lower portions of the spaces between the ribs, and a helical baffle extending longitudinally through the casing and having the diameter thereof substantially the same as the internal diameter of the ribs.

5. A conduit adapted to have fluid under pressure flow therethrough and comprising a tubular horizontally disposed casing having a longitudinal series of spaced apart transversely extending annular external ribs and a longitudinal series of spaced apart annular internal ribs and embodying at the bottom thereof means forming a depending longitudinal sump in communication with the lower portions of the spaces between the internal ribs, and a helical baffle disposed in, and extending longitudinally of, the casing.

6. A conduit adapted to have fluid under pressure flow therethrough and comprising a tubular horizontally disposed casting-formed casing having a longitudinal series of equidistantly spaced apart transversely extending annular external ribs, and a longitudinal series of equidistantly spaced transversely extending annular internal ribs disposed midway between the external ribs, and embodying at the bottom thereof integral means forming a depending longitudinal sump in communication with the lower portions of the spaces between the internal ribs, and a helical baffle extending longitudinally through the casing and having the diameter thereof substantially the same as the internal diameter of the internal ribs.

7. A conduit adapted to have fluid under pressure flow therethrough and comprising a tubular horizontally disposed casting-formed casing having a longitudinal series of equidistantly spaced apart transversely extending annular external ribs, and a longitudinal series of equidistantly spaced transversely extending annular internal ribs disposed midway between the external ribs, and embodying at the bottom thereof integral means forming a depending longitudinal sump in communication with the lower portions of the spaces between the internal ribs, and a helical baffle disposed centrally in, and extending longitudinally of, the casing and mounted so that it is rotatable about its axis.

8. A conduit adapted to have material pass longitudinally therethrough and comprising an imperforate tubular horizontally disposed casing having a series of spaced apart internal ribs and embodying at the bottom portion thereof an integral longitudinal depending sump in direct communication with the lower portions of the spaces between said ribs, and a helical baffle mounted in, and extending longitudinally of, the casing and serving to cause the material passing through the casing to impinge against the ribs.

9. A conduit adapted to have fluid material flow therethrough and comprising a substantially imperforate tubular casing having a series of spaced apart internal ribs and embodying integral means forming a longitudinal sump in communication with the interior of the casing, and a helical element disposed centrally in, and extending longitudinally of, the casing, mounted so that it is rotatable about its axis and serving to cause the material passing through the casing to impinge against the ribs.

10. An elongated conduit adapted during use to have fluid material flow longitudinally therethrough and comprising a substantially imperforate tubular casing having a longitudinal series of equidistantly spaced, transversely extending, independent, truly annular, single thickness internal ribs of the same internal diameter, of less thickness than radial width, and so spaced apart that they form between them ring shaped pockets of greater depth than thickness, and a helical baffle mounted in, and extending longitudinally through, the central portion of the casing, having the diameter thereof substantially the same as the internal diameter of the ribs, and serving to cause the material passing through said casing to flow against said ribs.

HAROLD J. GOODYER.

REFERENCES CITED

The following references are of record in the file of this patent:

UNITED STATES PATENTS

| Number | Name | Date |
| --- | --- | --- |
| 653,677 | Ibert | July 17, 1900 |
| 1,179,669 | Siepmann | Apr. 18, 1916 |
| 1,831,473 | Adams | Nov. 10, 1931 |
| 1,900,394 | Cottrell | Mar. 7, 1933 |
| 1,496,345 | Lichtenthawler | June 3, 1924 |
| 1,880,185 | Kerns et al. | Sept. 27, 1932 |
| 2,342,774 | Wheatley | Feb. 29, 1944 |
| 2,207,399 | Gaertner | July 9, 1940 |
| 2,244,800 | Pascale | June 10, 1941 |
| 2,281,207 | Schoen | Apr. 28, 1942 |
| D. 24,493 | Ledward | June 25, 1895 |

FOREIGN PATENTS

| Number | Country | Date |
| --- | --- | --- |
| 184,847 | France | July 18, 1887 |
| 408,284 | Germany | Jan. 12, 1925 |
| 473,516 | France | Jan. 14, 1915 |
| 306,954 | Germany | Nov. 26, 1915 |
| 744,258 | France | Apr. 18, 1933 |
| 481,806 | France | Oct. 24, 1916 |